Oct. 29, 1963 A. WHATLEY, JR., ETAL 3,108,688

PACKAGES

Filed Sept. 25, 1961 2 Sheets-Sheet 1

INVENTORS

ALLAN WHATLEY, JR.
ROBERT EDWARD CLOUGH

BY Lynn Barratt Morris

ATTORNEY

INVENTORS
ALLAN WHATLEY, JR.
ROBERT EDWARD CLOUGH
BY Lynn Barratt Morris
ATTORNEY

United States Patent Office 3,108,688

Patented Oct. 29, 1963

3,108,688
PACKAGES

Allan Whatley, Jr., Westlake, Ohio, and Robert Edward Clough, Newark, Del., assignors to E. I. du Pont de Nemours and Company, Wilmington, Del., a corporation of Delaware Filed Sept. 25, 1961, Ser. No. 140,387
13 Claims. (Cl. 206—62)

This invention relates to packages of flexible, sensitive plates including photosensitive plates, and more particularly to packages of curved, photosensitive plates.

Recently, photopolymerizable printing plates have become available in commerce and are being widely used by the printing industry. These plates are described in numerous U.S. patents including 2,791,504, 2,923,673, 2,927,022 and 2,951,758. One type of such plates generally has a thin, flexible metal support bearing the layer of photopolymerizable material. The plates may vary in dimensions and be of considerable length.

An object of this invention is to provide simple, sturdy packages of flexible plates, especially photosensitive plates. A related object is to provide such packages which are easy to assemble and from which the sensitive plates can be removed without injury to the sensitive surfaces. Another object is to provide such packages which embody inexpensive drums or casings and packing materials.

It is a further object of this invention to provide a simple and sturdy package for transporting a plurality of flexible, curved sensitive plates. Still further objects will be apparent from the following description of the invention.

The novel packages of this invention comprise a cylindrically shaped drum or casing having a bottom and a removable top, into which there is fitted a protective sheath for a curved, flexible, sensitive plate, said sheath having a plurality of panels disposed at an obtuse angle to each other, each of the two outermost panels being disposed in an acute angle and adapted to receive an end of the curved plate, the respective areas of the panels contacting the outer surface of said plate and the outer edges of the panels being adapted to contact the inner surface of the drum.

The drums may contain a plurality of said protective sheaths and interfitted flexible sensitive plates or may contain a single such plate. Where the latter is of greater length than the internal circumference of the drum, the sheath and plate can be disposed in spiral fashion and means provided for holding the inner edge of the sheath in a fixed position.

The novel packages of the invention will now be more fully described in important practical aspects by reference to the accompanying drawings which form a part of this application, and wherein.

Figures 1, 2, 3, 4:
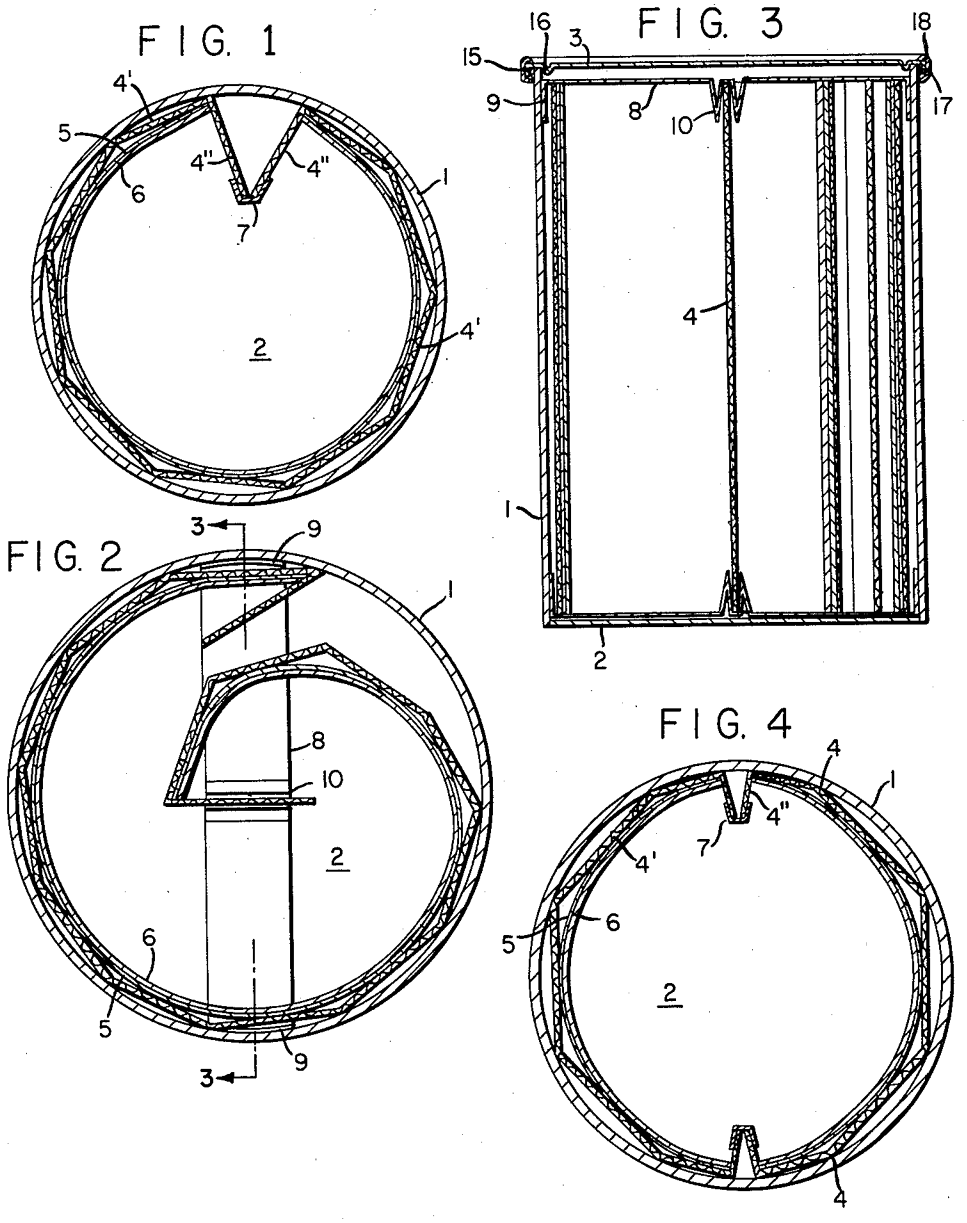
FIG. 1 is a horizontal sectional view of a drum containing a single flexible sensitive plate.
FIG. 2 is a horizontal sectional view of a drum containing a different single flexible sensitive plate.
FIG. 3 is a vertical sectional view taken along the lines 3—3 of FIG. 2.
FIG. 4 is a horizontal sectional view of a drum containing two flexible sensitive plates.

Referring now to the drawings, wherein similar parts have the same reference numerals throughout the several views, and more particularly to FIG. 1, a sturdy, lightproof cylindrical drum 1 having a bottom 2 and a suitable cover 3 (shown in FIG. 3) has a protective sheath 4 disposed about the curved inner surface of the drum. This sheath has a plurality of inner panels 4′ and two end panels 4″. The apexes of panels are adapted to contact the curved surface of the drum. A curved, sensitive plate comprising a support 5 and a sensitive surface 6 is encased by said sheath, the central areas of the panels of the sheath being essentially tangential to the rear, non-sensitive surface. The ends of the plate abut the inner surface of the end panels and retain the ends of the plate in place. In general, the end panels will form an acute angle (i.e., of less than 90°) with the adjacent side panels of the sheath.

As shown in FIG. 1, the outer ends of the protective retaining sheaths are fastened together with an adhesive tape 7. However, other suitable fastening means can be used.

In FIG. 2, there is shown a flexible sensitive plate of substantially greater length than the inner circumference of the drum. Likewise, the protective sheath is longer than said circumference. The plate and sheath are disposed in spiral fashion and the inner end panel of the sheath is held in place by means of retaining strip 8. This strip, which can be a stiff cardboard or metal strip, has laterally depending end sections 9 which fit between the sheath and curved walls of the drum. The central part of the retaining strip has a laterally depending M-shaped fold 10 and the end of the protective sheath fits into the fold. If desired, a retaining strip can be placed at each end of the drum and such a construction is shown in FIG. 3.

The alternative package shown in FIG. 4 is self-explanatory. In this variation, two curved sensitive plates whose total length is less than the inner circumferential length of the drum are placed in the drum. The two adjacent end panels are fastened together with a tape 7. Three or four curved sensitive plates of lesser length can be packaged in the same way.

Figure 5:
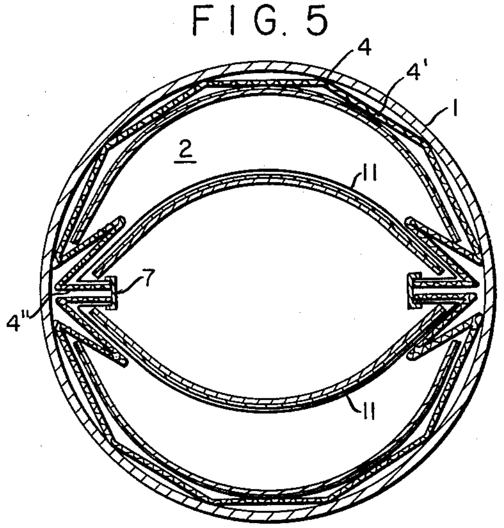
FIG. 5 is a horizontal sectional view of a drum containing four flexible plates.

In the further alternative package shown in FIG. 5, each of the two protective sheaths has a double V-shaped fold forming two retaining panels. A curved sensitive plate is encased in the sheath as in FIG. 1 and the panel of the first acute fold retains this plate in place, and the other panels contact the outer surface of the support. A plate which may have a curvature of the same or greater diameter than the outer plates fits within the outer fold of the protective sheath and the edges of the adjacent or abutting end panel are fastened together with tape 7 in the manner previously described. Tapes 11 are adhesively joined to the respective panels of the sheath and contact the back surface of the support holding it in place and eliminating the need for a further sheath. More plates can be added by providing additional end folds.

Figure 6:
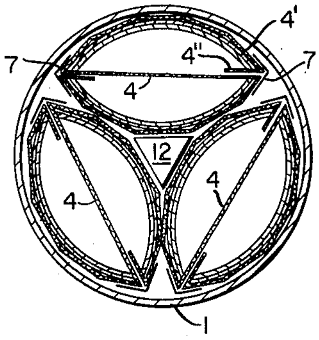
FIG. 6 is a horizontal sectional view of a drum containing six flexible plates.

The package shown in FIG. 6 is designed to hold six sensitive plates of still shorter length than those shown in the previous packages. In this package, it is not essential that the outer sheaths have a plurality of panels as with a curvature of small diameter there is a small area of contact of the sheath with the wall surface. In this case, it is necessary for the sheath to be more flexible, e.g., ninety-pound kraft or single-faced corrugated paper. Preferably, however, the sheaths will have panels to insure against injury of the plate from outside localized forces. The drum of FIGS. 6 and 7 has a central spindle or column 12 against which the inner protective sheath abut. As shown, the column is triangular in shape as this is a preferred but not a necessary shape. This column can be held in place by means of retaining folder 13 placed in the top and preferably also in the bottom (not shown) of the drum. The folder has in one panel a socket 14 which interfits with the end of the spindle.

In general, the bottom of the drum will be permanently fastened to, or integral with, the drum so that the package will be opened from one end by removal of the cover. A suitable cover is shown in FIG. 3 and it has a depending outer lip or rim 15 and inner depending groove 16 which interfit with the end of the cylindrical walls. The end of the drum can be provided with a metal bead or edge 17, and a clamping or sealing ring 18 fitted over the bead and depending lip or rim. Suitable clamping or sealing rings are known in the art and they often have a lever actuating member as a part of the ring. A suitable such lever arrangement is shown in page 1 U.S. Patent 1,752,996.

Figure 7:
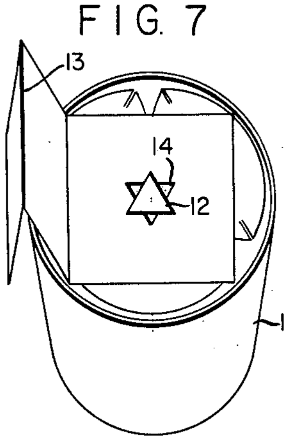
FIG. 7 is a perspective view looking downwardly on the drum of FIG. 6 and showing a retaining folder for the plates and spindle.

From the above description, it will be apparent that the thickness of the drum, protective sheaths, support and sensitive layer of the sensitive plates, and the tapes, etc., have in some instances been exaggerated for the sake of clarity in understanding the nature of the packages. In FIG. 7 the sheaths are in outline and the detail of them and the sensitive plates and adhesive tapes were not included for similar reasons. Also, the number of panels of the protective sheaths, ordinarily, will be greater than those shown in FIGS. 1–5. Again, this is for clarity since with a larger number of panels there is better protection of the encased plates. Usually the panels and creases or scoring will be parallel to the axis of curvature of the plates.

From the above description it will be apparent that the invention provides a simple and practical manner for packing flexible sensitive plates by the simple expedient of curving the plate or selecting a precurved plate, inserting it in the protective sheath, placing one or more of the encased plates in the drum and closing the drum. Suitable jigs can be provided to hold the sheaths while encasing the plates. The sheaths will, of course, be prepared in advance by scoring or creasing them to form panels of the proper size to fit the particular plate or plates and drum.

In assembling the package, this can be done by having the drum disposed in an essentially horizontal position or at an angle, then carefully sliding the protective sheath containing the plate into the drum, attaching an end or ends of the outermost retaining panels in a suitable manner, e.g., by means of the adhesive tape, and closing the drum. Other packing material, desiccants, instructions for use of the packaged plates, etc., can be introduced into the drum at the proper time.

In assembling the package of FIG. 5, a suitable jig can be used to hold the sheath, the outer plate inserted, then the inner one, and the sheath with both plates inserted into the drum. The tape can be joined to the sheath before the inner plate is placed in the sheath. The second protective sheath with the encased plates is then inserted into the drum and the ends of the abutting sheaths fastened together with an adhesive tape and completing the assembly in a manner described above.

The packages of FIGS. 6 and 7 can be made by first placing the spindle retaining folder and spindle in the drum and sliding into the drum the double sheath and encased curved plates held in adjacent position by the tapes as shown in the drawings. After the foregoing three units are inserted, a retaining folder is fitted over the top of the spindle and the cover applied to the drum. Similar packages can be made by eliminating the spindle and folders. Also, two pairs or four pairs of adjacent sheaths and encased plates can be placed in a drum instead of three as shown in FIG. 6.

The sensitive plates can be removed from the packages in the reverse manner. Since the sensitive surfaces should not be touched, after removal of the sheath-holding means, i.e., tape and/or retaining strip or retaining folder, with the drum in an essentially horizontal position, the end panels of the sheath are grasped and the assembly pulled out from the drum. Other ways of removing the sensitive plates and sheaths will be apparent from the above description.

The drums used in accordance with this invention can be made of various materials including metal, fiber, paperboard, laminated paperboard, cardboard, etc. It is obvious that the drum may have various types of protective layers on its inner surfaces to insure against the introduction of moisture, etc. into the closed drum. For example, a paper or fiber drum may be lined with aluminum foil and polyethylene as moisture barriers. The covers may be made of similar material but ordinarily will be made out of metal. The protective sheaths used to encase the sensitive plates can be made of various materials which form reasonably stiff sheets of cushioning material. The invention is not, of course, limited to the sheaths being made of the corrugated board shown, that is, having a corrugated sheet of paper disposed between two sheets of smooth paper, but a plurality of laminations of such material can be used. Also, the sheaths may be made of a single piece of paperboard or fiberboard stock. Also, they can be made of a foam type, plastic type material which has rigidity and resilience and can be folded into panels. The sheaths can be made in whole or in part of laminated cloth, plastic coated metals, and a combination of such materials.

It is obvious that the drums be light-proof and moisture-proof since humid conditions adversely affect most photosensitive materials, such as the photopolymerizable printing plates referred to above for which the present packages were expressly designed. In order to reduce the humidity within the packages, there could be included several small packages of a desiccant, e.g., silica gel, in the drums. This could conveniently be done by placing them under a circular pad of corrugated paper, or other material, at the bottom of the drum.

While the invention has been described primarily in terms of packaging photosensitive plates and, more particularly, photopolymerizable printing plates, it is obvious that the invention can be used to package other types of flexible plates having a sensitive surface. Thus, the invention is useful for packaging presensitized flexible lithograph plates for offset printing. Also the packages can be used to protect the surface of ferrotype plates, copper engravings, and flexible mirrors. Indeed, the invention is not limited to the packaging of flexible plates since in some cases stiff, curved plates can be packaged in a similar manner.

The present invention has numerous advantages as will be apparent from the foregoing description. Its principal advantages are that the packages are relatively simple in construction and can be made from inexpensive and readily available materials. The various packaging materials, that is, the protective sheaths, can be readily made from inexpensive, commercially available materials and they can be readily cut and scored or creased by means of conventional paperboard handling equipment or by means of a leather press.

The invention is particularly useful and, therefore, advantageous in protecting large flexible sheets or plates having delicate surfaces from damage to said surfaces during shipment and storage.

Another advantage is that the plates can be inserted into the drums without any danger of marring or abrading the sensitive surfaces. For example, the plates can be inserted into, and removed from, the packages without contact with the fingers which might impair the usefulness of the photosensitive or other delicate surfaces. A further advantage is that the packages may be assembled and disassembled with safety. In handling the thin, flexible plates, for example, contact with their sharp edges can be avoided by grasping the protective sheaths. The complete packages can be shipped by common carriers without damage. Still other advantages will be apparent from the above description of the invention and include the important advantage that the kinking of the thin metal backing of the sensitive plate is avoided.

We claim:

1. A package comprising a cylindrical drum having a removable cover, said drum containing at least one protective sheath for a curved sensitive plate, said sheath having a plurality of panels disposed at an obtuse angle to each other, each of the two outermost panels being disposed at an acute angle and adapted to receive the end of said curved sensitive plate, the respective central areas of the panels contacting the non-sensitive surface of the plate, and the apexes of the panels being adapted to contact the inner surface of the drum.

2. A package according to claim 1 having means for holding an outermost panel in a fixed position with reference to said plate.

3. A drum according to claim 1 containing a plurality of protective sheaths and interfitted flexible curved sensitive plates.

4. A package which comprises a cylindrical drum having a removable cover, at least one protective sheath adjacent the curved inner surface of the drum, said sheath having end panels and a plurality of inner panels disposed at an obtuse angle to each other, the apexes of said panels being adapted to contact said surface, a curved sensitive plate in said sheath with its non-sensitive surface contacting the central areas of the inner panels, said end panels also being disposed at an acute angle and adapted to hold the ends of the curved plates.

5. A package according to claim 4 wherein said sheath and said plate extend substantially around the inner circumference of the drum and the edges of the end panels are fastened to each other.

6. A package according to claim 4 wherein the sheath and plate are substantially longer than the inner circumference of the drum and are disposed in the drum in a spiral manner.

7. A package according to claim 4 provided with means for holding the inner end of the spirally disposed sheath against movement.

8. A package comprising a cylindrical drum having a removable cover, two protective sheaths adjacent the inner surface of the drum, each sheath having an effective length about equal to half the inner circumference of the drum, each such sheath having end panels and a plurality of inner panels disposed at an obtuse angle to each other, the apexes of said panels being adapted to contact said surface, a curved sensitive plate in each sheath, the nonsensitive surface contacting the central areas of the inner panels, said end panels also being disposed at an acute angle and adapted to hold the ends of the curved plates, the edges of the end panels of one of said sheaths being fastened to the abutting edges of the end panel of the other sheath.

9. A package according to claim 8 wherein said plate is flexible and has a photopolymerizable layer.

10. A package comprising a cylindrical drum having a removable cover, at least one protective sheath adjacent the curved inner surface of the drum, said sheath having a plurality of inner panels disposed at an obtuse angle to each other and at least three adjacent end panels disposed to form at least one Z-shaped fold, the apexes of the inner panels being adapted to contact the curved surface of the drum, a curved sensitive plate in said sheath with its nonsensitive surface contacting the central areas of the inner panels and fitting within the first acute angle of the end panels, a curved sensitive plate in said sheath having its ends interfitting with other acute angles of said end panels, there being at least four such plates disposed in the drum and the outer edges of the abutting end panels of the sheath being fastened together.

11. A package comprising a cylindrical drum having a removable cover, a central spindle in said drum, and a plurality of protective sheaths and encased curved flexible sensitive plates placed between the spindle and the curved walls of the drum, each sheath contacting the nonsensitive base of the plates and having end panels disposed in a horizontal manner and forming an acute angle with the adjacent portion of the sheath, the ends of said plates fitting within the acute angles.

12. A package according to claim 11 having in each end of the drum a packing folder the inner panels of which have a socket which interfits with said spindle.

13. A package according to claim 11 wherein the plate has a photopolymerizable layer.

References Cited in the file of this patent

UNITED STATES PATENTS

| | | |
|---|---|---|
| 2,517,767 | Cody | Aug. 8, 1950 |
| 2,841,277 | Paige | July 1, 1958 |